US010697305B2

(12) United States Patent
Yang et al.

(10) Patent No.: US 10,697,305 B2
(45) Date of Patent: Jun. 30, 2020

(54) METHOD FOR MAKING HYBRID CERAMIC/METAL, CERAMIC/CERAMIC BODY BY USING 3D PRINTING PROCESS

(71) Applicant: GENERAL ELECTRIC COMPANY, Schenectady, NY (US)

(72) Inventors: Xi Yang, Dayton, OH (US); Brian Peterson, Dayton, OH (US)

(73) Assignee: General Electric Company, Schenectady, NY (US)

(*) Notice: Subject to any disclaimer, the term of this patent is extended or adjusted under 35 U.S.C. 154(b) by 503 days.

(21) Appl. No.: 14/991,413

(22) Filed: Jan. 8, 2016

(65) Prior Publication Data
US 2017/0197359 A1    Jul. 13, 2017

(51) Int. Cl.
B28B 1/00    (2006.01)
B28B 1/14    (2006.01)
(Continued)

(52) U.S. Cl.
CPC ............... F01D 5/18 (2013.01); B28B 1/008 (2013.01); B28B 1/14 (2013.01); B28B 7/342 (2013.01); B28B 11/24 (2013.01); B28B 23/02 (2013.01); B32B 18/00 (2013.01); C04B 35/111 (2013.01); C04B 35/14 (2013.01); C04B 35/48 (2013.01); C04B 35/505 (2013.01); C04B 35/622 (2013.01); C04B 37/001 (2013.01); C04B 37/021 (2013.01); B29K 2101/10 (2013.01); B29K 2101/12 (2013.01); B29L 2031/757 (2013.01); C04B 2235/483 (2013.01); C04B 2235/6022 (2013.01); C04B 2235/6028 (2013.01); C04B 2235/94 (2013.01);
(Continued)

(58) Field of Classification Search
CPC .......... B28B 1/008; B28B 1/14; B28B 7/342; B28B 11/14; B28B 23/02; B29K 2101/10; B29K 2101/12; B29L 2031/757; B32B 18/00; F01D 5/18; F01D 2220/30; F01D 2230/211; F01D 2300/20; F01D 2300/603
See application file for complete search history.

(56) References Cited

U.S. PATENT DOCUMENTS 4,563,125 A * 1/1986 Boudigues ................ F01D 5/18
                                                        415/115
5,204,055 A    4/1993 Sachs et al.
(Continued)

FOREIGN PATENT DOCUMENTS

CA    2 954 024 A1    1/2016
DE    4 310 246 A1    10/1994
WO    2015/006403 A1    1/2015

OTHER PUBLICATIONS

Heinzl, J., and Hertz, C. H., "Ink-Jet Printing," Advances in Electronics and Electron Physics, vol. 65, pp. 91-171 (1985) (Abstract).
(Continued)

Primary Examiner — Jacob J Cigna
(74) Attorney, Agent, or Firm — Kristi L. Davidson; General Electric Company

(57) ABSTRACT

This invention relates to a product and a method of preparing ceramic and/or ceramic hybrid materials through the construction of a printed die. The printed die being made by three dimensional printing or additive manufacturing processes possesses both an external geometry and an internal geometry.

23 Claims, 4 Drawing Sheets

(51) Int. Cl.

| | | |
|---|---|---|
| *B28B 11/24* | (2006.01) |
| *B28B 7/34* | (2006.01) |
| *B29L 31/00* | (2006.01) |
| *C04B 35/111* | (2006.01) |
| *C04B 35/622* | (2006.01) |
| *C04B 37/02* | (2006.01) |
| *C04B 35/14* | (2006.01) |
| *C04B 35/48* | (2006.01) |
| *C04B 35/505* | (2006.01) |
| *F01D 5/18* | (2006.01) |
| *B28B 23/02* | (2006.01) |
| *C04B 37/00* | (2006.01) |
| *B32B 18/00* | (2006.01) |
| *B29K 101/10* | (2006.01) |
| *B29K 101/12* | (2006.01) |

(52) U.S. Cl.
CPC .. *C04B 2235/945* (2013.01); *C04B 2237/341* (2013.01); *C04B 2237/343* (2013.01); *C04B 2237/345* (2013.01); *C04B 2237/84* (2013.01); *F05D 2220/30* (2013.01); *F05D 2230/211* (2013.01); *F05D 2300/20* (2013.01); *F05D 2300/603* (2013.01)

(56) References Cited

U.S. PATENT DOCUMENTS

| | | | |
|---|---|---|---|
| 5,250,136 A | 10/1993 | O'Connor | |
| 5,295,530 A * | 3/1994 | O'Connor | B22C 9/04 |
| | | | 164/133 |
| 5,616,001 A * | 4/1997 | Boyd | F01D 5/284 |
| | | | 415/209.2 |
| 5,626,914 A | 5/1997 | Ritland et al. | |
| 5,667,191 A * | 9/1997 | Nemoto | B22C 1/00 |
| | | | 164/369 |
| 5,947,181 A * | 9/1999 | Davis | B22C 9/106 |
| | | | 164/131 |
| 7,413,001 B2 | 8/2008 | Wang et al. | |
| 7,448,433 B2 * | 11/2008 | Ortiz | B22C 7/00 |
| | | | 164/516 |
| 8,444,903 B2 | 5/2013 | Lyons et al. | |
| 8,561,668 B2 | 10/2013 | Castle et al. | |
| 2003/0062145 A1 * | 4/2003 | Frasier | B22C 9/02 |
| | | | 164/122.1 |
| 2005/0069411 A1 * | 3/2005 | Bast | F01D 5/147 |
| | | | 415/199.5 |
| 2005/0156361 A1 * | 7/2005 | Holowczak | B28B 7/342 |
| | | | 264/603 |
| 2005/0205232 A1 * | 9/2005 | Wang | B22C 9/10 |
| | | | 164/361 |
| 2008/0149483 A1 * | 6/2008 | Robison | G01N 27/4062 |
| | | | 204/424 |
| 2010/0025001 A1 * | 2/2010 | Lee | B22C 7/02 |
| | | | 164/23 |
| 2011/0097522 A1 * | 4/2011 | Hasz | G01B 7/14 |
| | | | 428/34.4 |
| 2011/0142684 A1 * | 6/2011 | Campbell | B23P 15/04 |
| | | | 416/248 |
| 2012/0193841 A1 * | 8/2012 | Wang | B22F 3/1055 |
| | | | 264/645 |
| 2013/0022471 A1 * | 1/2013 | Roberts, III | F01D 5/005 |
| | | | 416/229 R |
| 2014/0072447 A1 * | 3/2014 | Propheter-Hinckley | |
| | | | B22C 9/04 |
| | | | 416/96 R |
| 2014/0093384 A1 | 4/2014 | Mironets et al. | |
| 2014/0241900 A1 * | 8/2014 | Roberts, III | F01D 5/005 |
| | | | 416/241 B |
| 2014/0339745 A1 * | 11/2014 | Uram | B29C 39/36 |
| | | | 264/681 |
| 2015/0093249 A1 * | 4/2015 | Lang | F01D 5/14 |
| | | | 416/241 B |
| 2015/0108677 A1 | 4/2015 | Mark et al. | |
| 2015/0118060 A1 * | 4/2015 | Kumar | F01D 5/005 |
| | | | 416/241 R |
| 2016/0158964 A1 * | 6/2016 | Miarecki | B32B 3/263 |
| | | | 415/173.1 |
| 2016/0256918 A1 * | 9/2016 | Schilling | B22C 7/02 |
| 2016/0369634 A1 * | 12/2016 | Slavens | F01D 5/28 |
| 2017/0136534 A1 * | 5/2017 | Casteilla | B22D 25/02 |
| 2017/0259329 A1 * | 9/2017 | Felwor | B22D 19/02 |
| 2018/0009128 A1 * | 1/2018 | Sokol | B28B 1/001 |

OTHER PUBLICATIONS

Extended European Search Report and Opinion issued in connection with corresponding EP Application No. 17150184.4 dated Jun. 16, 2017.

Office Action issued in connection with corresponding CA Application No. 2953611 dated Sep. 17, 2018.

\* cited by examiner

METHOD FOR MAKING HYBRID CERAMIC/METAL, CERAMIC/CERAMIC BODY BY USING 3D PRINTING PROCESS

INTRODUCTION

This invention generally relates to reinforced ceramic or ceramic composite materials, and methods for preparing said materials, components, and/or structures through additive printing techniques, where the composite materials have both internal and external geometries, and more particularly to methods of using additive printing technologies to make functional composite or hybrid components.

BACKGROUND

The present invention generally relates to a method of using additive manufacturing processes to produce reinforced ceramic or ceramic composite materials, such as but not limited to ceramic-ceramic or ceramic-metal hybrid (i.e., cermet) materials.

Many modern engines and next generation turbine engines require components and parts having intricate and complex geometries, which require new types of materials and manufacturing techniques. One such material includes ceramic components and parts, which reduce the need for cooling and are much lighter than conventional alloy materials in current engines. Integration of ceramics into next generation engine thus has the advantages of being lighter, chemically inert, and highly heat resistant. However, ceramics are also known to be weak in shearing and tension, and too brittle for use in certain applications. Thus, there is a need to develop new ceramic composites and methods of manufacturing these ceramic parts.

Conventional techniques for manufacturing engine parts and components involve the laborious process of investment or lost-wax casting. One example of investment casting involves the manufacture of a typical rotor blade used in a gas turbine engine. A turbine blade typically includes hollow airfoils that have radial channels extending along the span of a blade having at least one or more inlets for receiving pressurized cooling air during operation in the engine. Among the various cooling passages in the blades, includes serpentine channel disposed in the middle of the airfoil between the leading and trailing edges. The airfoil typically includes inlets extending through the blade for receiving pressurized cooling air, which include local features such as short turbulator ribs or pins for increasing the heat transfer between the heated sidewalls of the airfoil and the internal cooling air.

The manufacture of these turbine blades, typically from high strength, superalloy metal materials, involves numerous steps. First, a precision ceramic core is manufactured to conform to the intricate cooling passages desired inside the turbine blade. A precision die or mold is also created which defines the precise 3-D external surface of the turbine blade including its airfoil, platform, and integral dovetail. The ceramic core is assembled inside two die halves which form a space or void therebetween that defines the resulting metal portions of the blade. Wax is injected into the assembled dies to fill the void and surround the ceramic core encapsulated therein. The two die halves are split apart and removed from the molded wax. The molded wax has the precise configuration of the desired blade and is then coated with a ceramic material to form a surrounding ceramic shell. Then, the wax is melted and removed from the shell leaving a corresponding void or space between the ceramic shell and the internal ceramic core. Molten metal is then poured into the shell to fill the void therein and again encapsulate the ceramic core contained in the shell. The molten metal is cooled and solidifies, and then the external shell and internal core are suitably removed leaving behind the desired metallic turbine blade in which the internal cooling passages are found.

The cast turbine blade may then undergo additional post casting modifications, such as but not limited to drilling of suitable rows of film cooling holes through the sidewalls of the airfoil as desired for providing outlets for the internally channeled cooling air which then forms a protective cooling air film or blanket over the external surface of the airfoil during operation in the gas turbine engine. However, these post casting modifications are limited and given the ever increasing complexity of turbine engines and the recognized efficiencies of certain cooling circuits inside turbine blades, the requirements for more complicated and intricate internal geometries is required. While investment casting is capable of manufacturing these parts, positional precision and intricate internal geometries become more complex to manufacture using these conventional manufacturing processes. Accordingly, it is desired to provide an improved casting method for three dimensional components having intricate internal voids.

Additive manufacturing processes have simplified the above described process by allowing the manufacture of synthetic model casting. In particular, a model of a component may be created by additive manufacturing techniques or 3D printing. A core is cast inside a synthetic model. The synthetic model may then be removed from the cast core, and then the cast core is used for casting an authentic component therearound. The core is removed from inside the authentic component, with an authentic component precisely matching the original synthetic model. This technology effectively creates a disposable core die (or "DCD"). U.S. Pat. No. 7,413,001 describes one application of this process.

The immediate application of this DCD technology allows the industry to produce complex components, structures, and parts using new combinations of materials or hybrid materials that can be incorporated into next generation engines. The DCD process has been demonstrated with success to accomplish this endeavor by utilizing additive manufacturing methods to produce master dies or DCDs that have geometries not previously achieved or at the very least more efficiently than previously accomplished through conventional investment casting processes.

The present invention applies the DCD additive printing technologies previously described to create a new family of hybrid materials and functional components that were previously never possible to produce by conventional manufacturing processes. In particular, the current invention overcomes the problems associated with investment and/or lost-wax casted products that lack intricate or complex internal geometries, cavities, or hollows. Particularly valuable materials would be ceramic-ceramic and ceramic-metal composite/hybrid systems. The present invention also solves some of the problems associated with conventional casting techniques, such as but not limited to core kissout, tipping, cracking scraps.

BRIEF DESCRIPTION OF VARIOUS EMBODIMENTS OF THE INVENTION

The disclosure is generally directed to a method of manufacturing complex components, structures, or parts by additively printing a die. An illustrative embodiment of the method includes additively manufacturing a disposable die, in particular, three dimensionally printing a disposable die. In another embodiment, the die has an internal opening or void, which defines a particular three dimensional internal cavity or body. In another aspect, the core has an internal opening defining a three dimensional body in addition to having an external geometry.

In one aspect, the invention relates to a process of manufacturing materials, components, parts, or structures having complex hollow internal geometries manufactured through an additive manufacturing (also known as 3D printing) process. Subsequently, the hollow internal geometries or cavities may be further injected or filled with a slurry, fluid or solid material(s).

In another aspect, the invention relates to a process of manufacturing materials, components, or structures having particular internal or external geometries or features by first creating a die through the additive manufacturing or three dimensional printing process, followed by incorporating or injecting one or more slurries, such as ceramic, into the die, resulting in a three dimensional body. The three dimensional body may, in one embodiment, have a hollow cavity defining a three dimensional internal shape or geometry into which another liquid, semi liquid, or solid material may be incorporated. In another embodiment, the three dimensional body may be a solid material such as but not limited to alumina, aluminum titanate, magnesium oxide, or nickel oxide.

In yet another aspect, the die may be used to produce a composite material having both a first phase of ceramic material and a second phase of either solid or liquid materials. In one embodiment, the second phase material may be the same or different type of ceramic material. In another embodiment, the second phase material may be a solid material (e.g., metal). The produced composite material may include ceramic materials in both the first and second phase to generate a ceramic-ceramic material. In an alternative embodiment, the produced composite material may include a ceramic material in the first phase and a solid, such as a metal made of alumina, aluminum titanate, magnesium oxide, or nickel oxide, for example, as the second phase.

In another aspect, the invention relates to a process of manufacturing a DCD that is used to create materials that are hybrid composites having both a ceramic phase and a metal phase. First, a slurry of ceramic material is injected into the DCD, which can be made of a variety of plastics and cured, thereby forming a three dimensional shell. In one embodiment, the DCD is manufactured in a way that would allow for the formation of a hollow cavity after the ceramic material is injected into the DCD. Second, after curing and firing the ceramic material, a metal component or phase is incorporated into the hollow cavity. In another embodiment, the metal phase is a preformed metal composition that matches the internal geometry of the formed ceramic cavity.

In yet another embodiment, the invention relates to an additive manufacturing process (e.g., three dimensional or 3D printing) to produce a die containing a complex internal hollow cavity or geometry having a certain internal and external geometrical aspect. The portions surrounding the hollow cavity may be filled with a first type of ceramic material, while the hollow internal geometry may be injected or filled during a second phase with the same or different type of ceramic material. In yet another embodiment, the ceramic body containing the hollow or cavity may further comprise a second phase that is a metal component having a geometry that matches the internal geometry created using the DCD such that the metal component fits in a lock and key fashion.

In one aspect of the invention, additive printing technologies are utilized in a method to manufacture and create novel families of hybrid materials and functional components not previously possible using conventional manufacturing processes. In particular, one aspect of the invention includes hybrid ceramic-ceramic materials, whereby the first ceramic material is the same as the second ceramic material. In another aspect, the hybrid ceramic-ceramic material may be at least two different types of ceramic materials. In yet another aspect, the invention includes a hybrid ceramic-metal composite.

In another embodiment, the invention relates to a component, part, or structure manufactured according to the present invention. In particular, the component, part or structure includes an external surface, shape, or geometry that is formed by incorporating or injecting a first phase of liquid or semi-solid material, such as ceramic, into an additively printed die. The first phase occupies the portion of the printed die corresponding to the external portion of the component, part, or structure. In addition, the component, part or structure will also include an internal void, cavity, or hollow that may be filled or injected with a second phase of material. The material present in the second phase may include solid, semi-liquid, or liquid material. The internal void, cavity, or hollow is created and separated from the first phase by a disposable die, which is removed following the incorporation of the first phase.

In yet another embodiment, the invention relates to a method of forming a composite structure comprising the steps of: (a) printing a die (10) having an external shape portion (300, 400) defining a three dimensional body and an internal shape portion (100, 200); (b) injecting a first material into the external shape portion (300, 400) of the die, wherein the external shape leaves a hollow within the internal shape portion (100, 200); (c) curing the first material to form the three dimensional body; (d) inserting or injecting at least one other material into the hollow portion of the internal shape portion (100, 200); and (e) sintering the three dimensional body after step (d) to form the composite structure.

In yet another embodiment, the invention relates to a method of forming a composite structure comprising adding a first material into a die having a cavity, wherein the cavity includes at least one protrusion within the cavity, and curing the first material to form a three dimensional body. Additional embodiments of this method include the following:
  wherein the first material is added by injection;
  wherein the first material is an inorganic material;
  wherein the cavity is produced by additive manufacturing the die, preferably by three dimensional printing;
  wherein the die is fabricated from thermoset or thermoplastic polymer;
  wherein the at least one protrusion within the cavity is a hollow or a solid protrusion;
  wherein the at least one protrusion is hollow;
  wherein the at least one protrusion is of a non-linear geometry;
  wherein the die is removed during the curing of the first material, thereby leaving at least one void where the at least one protrusion once existed;
  wherein the die is removed by heating in the range of 300-600° C.;
  further comprising adding at least one other material into the at least one void;

wherein the at least one other material is a solid or liquid material;

wherein the at least one other material is ceramic or metal;

wherein the metal is rod of alumina or quartz;

further comprising incorporating a binder prior to adding the at least one other material;

wherein the binder is applied to the at least one void, the at least one other material, or to both;

further comprising sintering or curing the at least one other material; and wherein the sintering or curing occurs at a temperature in the range of 1,000-1,600° C., preferably 1,600° C.

In still yet another embodiment, the invention relates to a ceramic-metal composite comprising a ceramic body representing an external portion (300, 400) of the composite, wherein the ceramic body includes an internal hollow cavity (100, 200) having an aspect ratio in the range of 100:1 to 5:1; and a metal insert capable of being inserted into the internal hollow cavity; and a ceramic-metal composite comprising a ceramic body representing an external portion, wherein the ceramic body includes an internal hollow cavity (100, 200) with an outside diameter in the range of approximately 0.010 inch to 0.100 inch and a depth of approximately 1 inch to 40 inches; and a metal insert capable of being inserted into the internal hollow cavity.

DETAILED DESCRIPTION OF PREFERRED EMBODIMENTS OF THE INVENTION

Further features and advantages of the invention will be seen from the following detailed description, which shows various embodiments of the invention. Those of skill in the art will recognize that other embodiments may be utilized, which include changes that do not alter or depart from the scope of the invention.

In one preferred embodiment of the invention, an additive manufacturing, an additive printing, a sequential printing or a three dimensional (3D) printing process is used to form a variety of geometrical shapes, cores and moulds which may be used in the fabrication of ceramic or ceramic composite materials. In one embodiment, a slurry of ceramic material is injected into an additively manufactured DCD, resulting in the formation of a three dimensional ceramic body. In one aspect, the resulting ceramic body contains an internal hollow or cavity into which a second phase or second fabrication process is used to introduce another ceramic material or metallic material to form a composite material.

In one aspect, the second phase may include the same or different ceramic material. In another aspect the second phase may include a metal material, such as a rod, thereby producing a composite material or hybrid material. After the second phase, the materials may be sintered at elevated temperatures to result in a dense material (i.e., densification). The resulting hybrid material, for example containing the metal rod, is reinforced having higher structural integrity when compared to components or parts lacking the metal rod.

The reinforcement, which may have been previously accomplished by incorporating a metal rod into a simple geometry (e.g., straight or non-curved) by drilling, for example, is now possible in more intricate or complicated geometries or shapes through the present invention.

Figure 1:
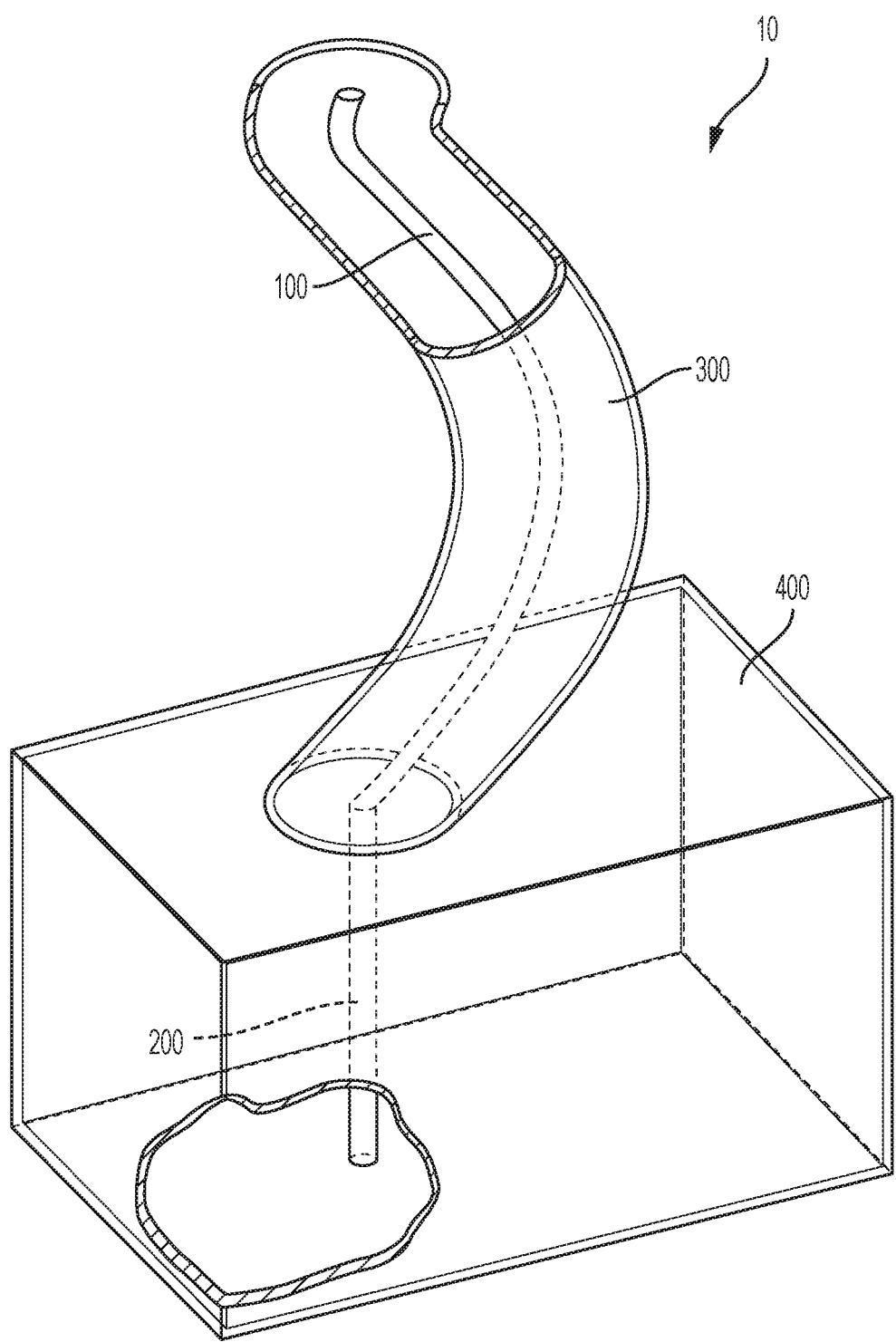
FIG. 1: A perspective view of a representative component (10) having both simple internal (200) and external geometries (400) and complex internal (100) and external (300) geometries.

As an example, FIG. 1 demonstrates a part or component having a complex external geometry, 300, a complex internal geometry 100, a simple external geometry 400, and a simple internal geometry 200. Previously, simple internal geometries created by investment or lost-wax casting, such as 200, were created by methods such as drilling, however, more complex geometries, such as 100, were not possible given the difficulty in drilling, for example curved holes. The present invention overcomes these issues by fabricating complex internal geometry through additively printing a DCD structure such that a hollow cavity is incorporated into the external geometry 300, 400.

In FIG. 1, a representative component, part or structure (10) is designed and additively printed such that the component, part or structure has an external (300, 400) and internal (100, 200) shell made of a resin, such as but not limited to plastics. As seen from the cut out portions, the additively manufactured component includes hollow channels (100, 200) such that when a first phase of material is cured and the disposable die is removed, channels (100, 200) are created within the cured material of the external portions (300, 400).

Figure 2:
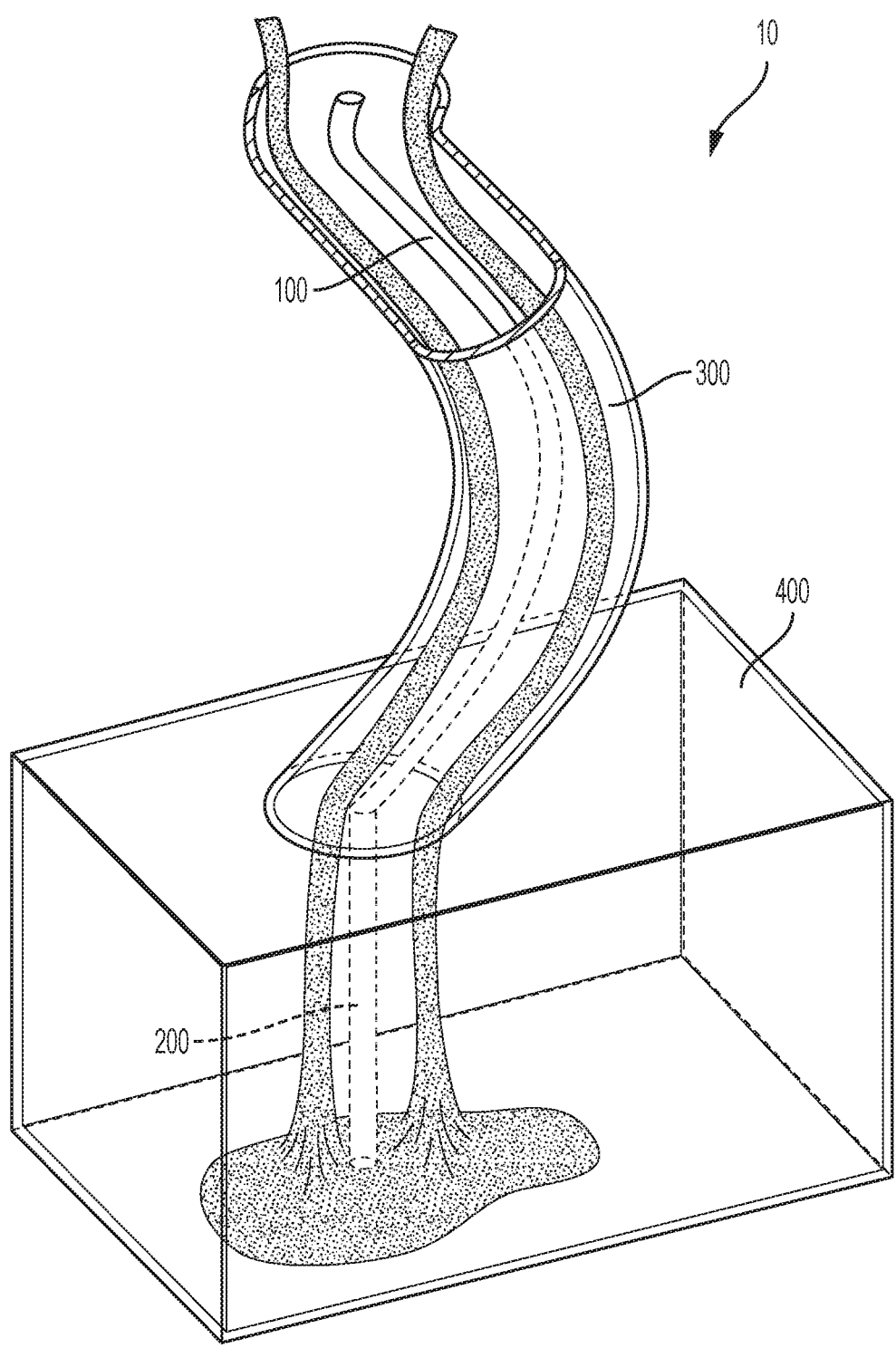
FIG. 2: A perspective view as described in FIG. 1 demonstrating the addition of a slurry material into the component prior to curing.

In FIG. 2, the external portions (300, 400) of the additively printed component are filled with a slurry of, for example, ceramic material, such that the slurry leaves a void, hollow or cavity (100, 200) created by the internal void, hollow, or cavity. The component, part or structure at this stage includes an additively printed shell, having both external and internal dimensions, and a slurry of materials that will be cured at a temperature of approximately 300° C.-500° C. This temperature serves two purposes, (1) to cure the slurry material of the external portion of the component and (2) to burn off (i.e., remove) the additively printed plastic die.

Figure 3:
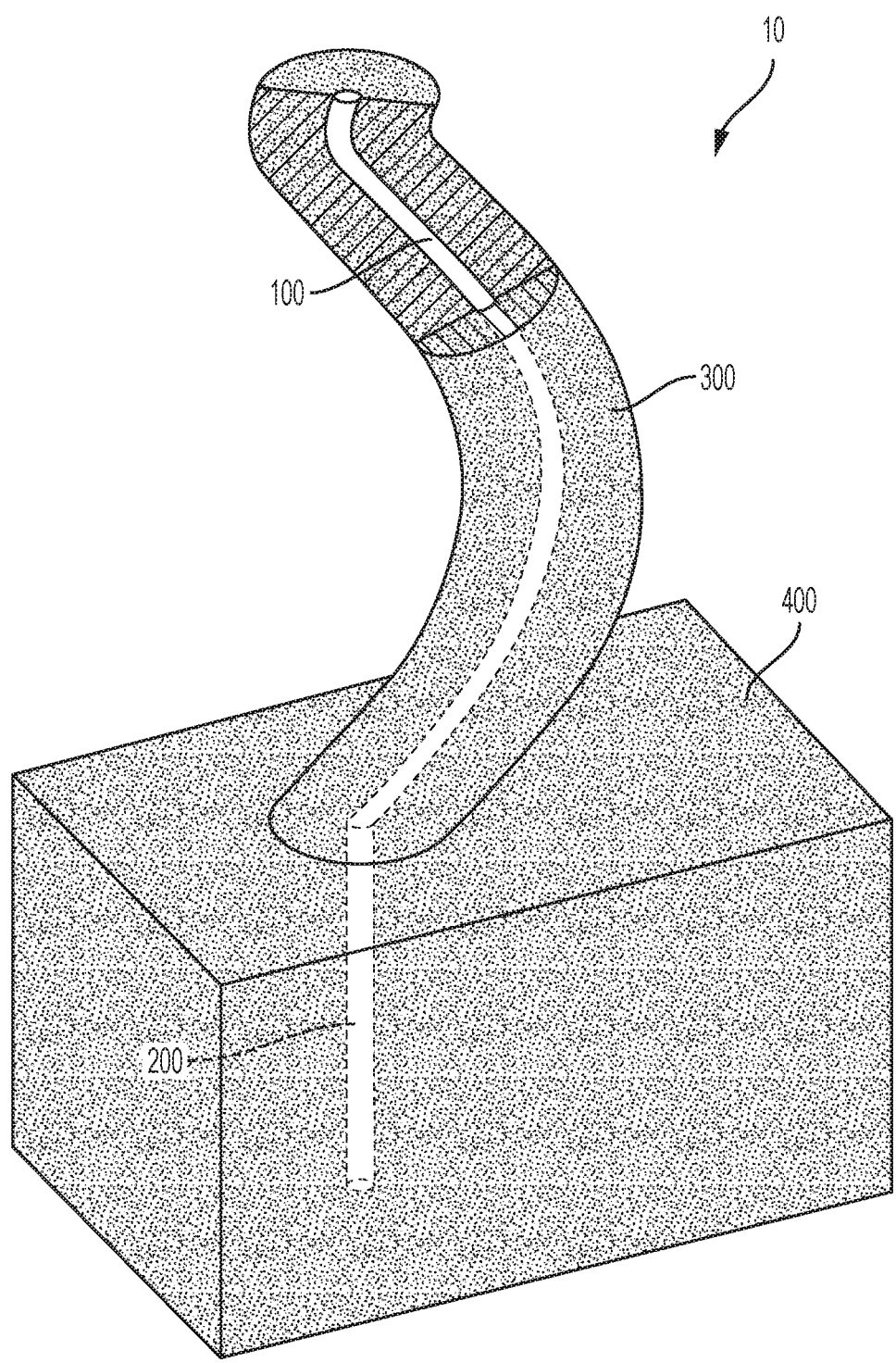
FIG. 3: A perspective view as described in FIG. 1 demonstrating the cured first phase of material in the complex external portion (300) and the simple external portion (400) wherein the complex internal portion (100) and the simple internal portion (200) remain unfilled provide for a channel for addition of a second phase of material.

In FIG. 3, the external portions (300, 400) of the component, part or structure has undergone curing and the die is removed through leaving a cured ceramic external three dimensional body (300, 400) and an internal void, hollow, or cavity (100, 200). The cut away of the external portion shows that the an internal void, hollow or cavity remains after the burn off.

Figure 4:
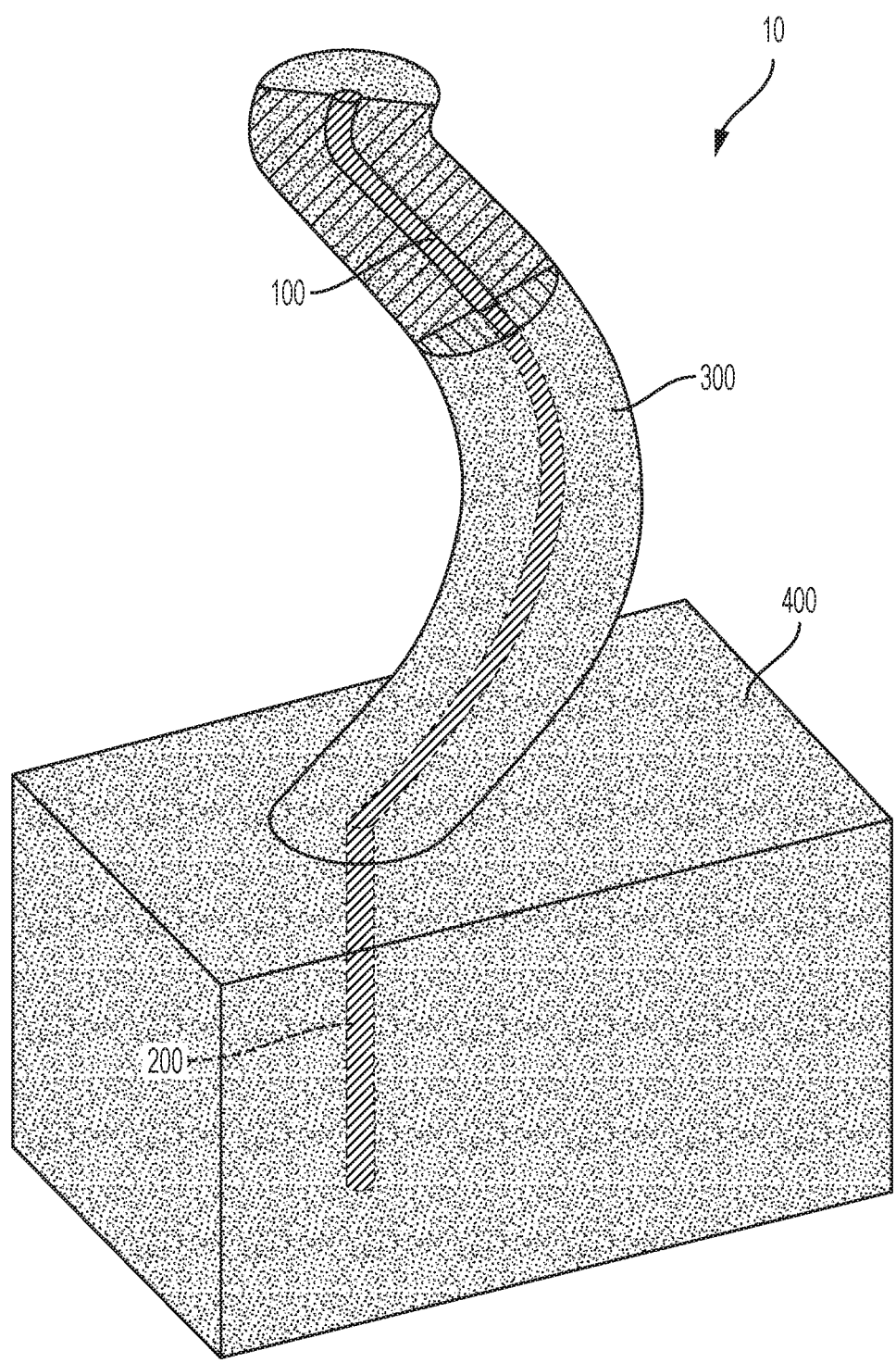
FIG. 4: A perspective view as described in FIG. 1 demonstrating the addition or insertion of a second phase of material into complex internal portion (100) and into simple internal portion (200).

In FIG. 4, the second phase of material (e.g., a liquid material or a solid material) is added or inserted to the internal portions (100, 200) of the body. Once again, the component, part or structure is heat to a temperature of approximately 1600° C. to sinter the first and second phase of material together to form a singular composite or hybrid material.

In one aspect, the invention relates to a method of forming a composite structure comprising additively manufacturing a DCD; injecting a first material into the disposable core die; curing or firing the first material to form a three dimensional body; removing the disposable core die to form a hollow body or cavity that has a specific geometry; inserting (injecting) at least one other material into the hollow body (e.g., a liquid or solid); and sintering the materials to form the composite or hybrid structure.

Additive manufacturing technology is a manufacturing process where a structure is built layer-by-layer with the assistance of computer programs, such as a Computer Aided Design (CAD) program. The CAD software, for example, helps in fabricating each planar layer by depositing a building material in certain X, Y, and Z coordinates until a final three dimensional structure is complete. With additive manufacturing, there is no need to develop or manufacture patterns or tools (i.e., casts or molds) to fabricate parts, thereby significantly decreasing the build times. In one aspect of the present invention, those of skill in the art will appreciate that a variety of computer software programs, such as CAD, may be used, so long as it is capable of programming specific coordinates in the fabrication of the DCD during the build process. Encompassed within the scope of this invention is a method of using an additive printing process that moves and fabricates in three dimensions (e.g., in the X, Y, and Z directions). Also encompassed in this invention is a fabrication process that moves in two dimensions where the manufacturing process produces the product in strips, one layer at a time. Therefore, movement is only required in the Y direction to form a layer, and then the Z direction to build the next layer. Finally, some emerging technologies are using a two dimensional array of mirrors to form an entire part layer at once, requiring movement in only one direction, the Z direction.

There are various types of additive manufacturing technologies available to those of skill in the art and the particular type selected for the fabrication of the DCD will depend entirely on the material used in its production. One type of 3D printing may include liquid-based methods, which apply photocurable polymer resins to form each part layer. These might include stereolithography (SLA), jetted photopolymer, or ink jet printing. For example, SLS printing is a well known technique that can be described as a process that utilizes a liquid plastic resin that is selectively cured with ultraviolet light in thin cross sections. The thin cross sections are formed layer-by-layer.

Another type of additive printing includes powder based printing process, such as selective laser sintering (SLS), direct metal laser sintering (DMLS) and three dimensional printing (3DP). In each of these powder based fabrication methods, powdered material is melted or sintered to form each part layer. For example, the SLS process utilizes powdered plastic materials that are selectively sintered by a laser layer-by-layer.

Another form of additive printing includes a solid-based process, which use non-powdered materials that are layered one on top of another and subsequently cut out. This method includes laminated object manufacturing (LOM), or fused deposition modeling (FDM).

Generally, the additive manufacturing process takes on the same sequence of steps, which as described at custompartnet.com, includes:

1. Create CAD model—For all additive processes, the designer must first use Computer-Aided Design (CAD) software to create a 3-D model of the part.
2. Convert CAD model into STL model—Each form of CAD software saves the geometric data representing the 3-D model in different ways. However, the STL format (initially developed for Stereolithography) has become the standard file format for additive processes. Therefore, CAD files must be converted to this file format. The STL format represents the surfaces of the 3-D model as a set of triangles, storing the coordinates for the vertices and normal directions for each triangle.
3. Slice STL model into layers—Using specialized software, the user prepares the STL file to be built, first designating the location and orientation of the part in the machine. Part orientation impacts several parameters, including build time, part strength, and accuracy. The software then slices the STL model into very thin layers along the X-Y plane. Each layer will be built upon the previous layer, moving upward in the Z direction.
4. Build part one layer at a time—The machine builds the part from the STL model by sequentially forming layers of material on top of previously formed layers. The technique used to build each layer differs greatly amongst the additive process, as does the material being used. Additive processes can use paper, polymers, powdered metals, or metal composites, depending upon the process.
5. Post-processing of part—After being built, the part and any supports are removed from the machine. If the part was fabricated from a photosensitive material, it must be cured to attain full strength. Minor cleaning and surface finishing, such as sanding, coating, or painting, can be performed to improve the part's appearance and durability.

The additive manufacturing process can fabricate dies or master dies out of virtually any type of material generally known and used in the additive manufacturing process. These materials may include, for example, plastics, metals, ceramics, or wood. It is also possible that the additive manufacturing process can fabricate the DCD out of a combination of materials. For example the manufacturing process can be made from a polymeric material, such as ultraviolet curable thermosets (e.g., epoxy, resin, urethane, cyanoacrylate, photopolymers, etc.) and powdered materials (e.g., nylon, glass filled nylon, polycarbonate, wax, metal, and sand bonded with heat cured resin). Other materials which would be readily apparent to those in the field may also be used in the process.

Representative materials used in the 3D printing process include polymers, such as thermoset and thermoplastic polymers. Representative thermoset polymers may include, for example, polymers belonging to the class of polyester, polyurethane, vulcanized rubber, a phenol-formaldehyde resin, duroplast, urea formaldehydes, melamine resin, diallyl-phthalate (DAP), epoxy resin, polyimides, or cyanate esters or polycyanurates or combinations thereof.

Representative thermoplastic polymers may include, for example, polymers belonging to the class acrylic, acrylonitrile butadiene styrene, nylon, polylactic acid, polybenzimidazole, polycarbonate, polyether sulfone, polyetherether ketone, polyetherimide, polyethylene, polyphenylene oxide, polyphenylene sulfide, polypropylene, polystyrene, polyvinyl chloride, Teflon, or combinations thereof.

In another aspect of the present invention, ceramic or ceramic hybrid components, parts or structures are created that have intricate or complex internal and external geometries. In conventional investment casting techniques, injection of materials into a cast results in the production of structures, components, or parts have specific external geometries. However, should a specific internal geometry be required, a separate core having the mirror image of the shape is required. These specific geometries are dictated by the external mold or internal core in which they are injected. In one aspect of the invention, the fabrication of a core die used in the casting process results in a product having specific internal and external geometries without the need to separately produce an external and/or internal mold and/or core.

The term "internal geometry" is generally understood to mean any cavity, hollow, opening having a complex or simple shape or geometry that is within an external geometry. A representative example, of an internal geometry may be found in FIG. 1, 100 or 200.

The term "external geometry" is generally understood to mean an outer shape or configuration of a body or three dimensional body. A representative example of an external geometry may be found in FIG. 1, 300 or 400.

Following the additive manufacturing of the die (e.g., DCD), a first slurry of materials is incorporated into the die. This portion of the fabrication process may be the first phase of fabrication. The first slurry may include a variety of material that can be cured and injected into the die. In one aspect of the invention, the slurry of material is an inorganic material, such as but not limited to a ceramic slurry. The ceramic material may be a powder or fibrous material. A variety of ceramic materials may used including, but not limited to, metallic oxides (e.g., alumina, beryllium oxides, and zirconia), glass ceramics, nitrides and carbides (e.g., silicon nitrides, boron carbide, silicon carbides, and tungsten carbides), glass (e.g., oxide (silica), silicates, phosphates, borosilicates), carbon and graphite (e.g., carbon-carbon composites), porcelain, yttria, and ceramic fibers. Upon injection of the ceramic material into the core die, the ceramic slurry forms a three dimensional structure or green ceramic body. The "green ceramic body" or "green body" is generally understood by those of skill in the art to represent a three dimensional body that is composed of a weakly bonded ceramic material prior to curing, sintering or firing. The curing, sintering or firing may occur at temperatures now known or future developed. In one embodiment, the curing temperature is less than about 100° C.

Once the green body is formed, the die can or may be removed through heating. In one embodiment, the elevated temperature simultaneously removes the die and sinters or cures the first slurry (e.g., ceramic). In another embodiment, the elevated temperature is sufficient to remove the die, but less than the required temperature to cure the first slurry. The removal of the die may be accomplished in a range of at least 300° C., in a more preferred embodiment, the die is removed at a temperature range of approximately a temperature range of 300-600° C., in an even more preferred embodiment, the die is removed at a temperature range of 400-500° C. The heating or firing to remove the die can be performed one, two, three, four, five, ten, or as many times as needed to accomplish the removal and/or densification of the first slurry.

In another embodiment, a second phase of fabrication for introducing a second type of materials may be combined with the first phase of materials. For example, between each heating or firing step a second slurry of ceramic or solid material may be incorporated. In one embodiment, a second slurry of material, such as ceramic, may be incorporate. In another embodiment, the second ceramic slurry may be same or different from the first slurry. In another aspect, the hollow cavity may be fabricated to accept a solid material, such as but not limited to metal component (e.g., a rod) which in one aspect can be preformed to match the internal geometry of the hollow cavity. The various alternative embodiments for materials (e.g., ceramics) and processes described for previous embodiments are equally applicant during the second phase of fabrication.

In another aspect of the invention, following the curing of the first slurry of materials, a binder may be applied before, during or after the injection of the second phase of the fabrication process. The binders that may be used include organic and inorganic materials. These binder materials are generally known in the art and described in, for example, U.S. Pat. No. 5,204,055.

The binder material may be such that the bonded particles have a high binding strength as each layer is deposited so that, when all the layers have been bonded, the component formed thereby is ready for use without further processing. In other cases, it may be desirable, or necessary, to perform further processing of the part. For example, while the process may be such as to impart a reasonable strength to the component which is formed, once the part is formed it can be further heated or cured to further enhance the binding strength of the particles. The binder in some cases can be removed during such heating or firing process, while in others it can remain in the material after firing. Which operation occurs depends on the particular binder material which has been selected for use and on the conditions, e.g., temperature, under which the heating or firing process is performed. Other post-processing operations may also be performed following the part formation.

Organic binders have been used in the ceramics industry and are typically polymeric resins obtained from a variety of sources. They can be either water soluble, such as celluosic binders, as used in extrusion technology, or they can be soluble in only volatile organic solvents, such as the butyral resins, as used in tape casting technology. The latter water soluble systems can be removed relatively quickly and seem particularly useful in the technique of the invention. Another type of organic binder would be a ceramic precursor material such as polycarbosilazane.

Inorganic binders are useful in cases where the binder is to be incorporated into the final component. Such binders are generally silicate based and are typically formed from the polymerization of silicic acid or its salts in aqueous solution. Another exemplary inorganic binder which can be used is TEOS (tetraethylorthosilicate). During drying, the colloidal silica aggregates at the necks of the matrix particles to form a cement-like bond. During firing, the silica flows and acts to rearrange the matrix particles through the action of surface tension forces and remains after firing. Soluble silicate materials have been used as binders in refractory castable materials, for example, and have the advantage, when used in the technique of the invention, of producing substantially the same type of molded refractory body that is used in the casting industry.

In some applications, it may be preferable that the binder harden relatively rapidly upon being deposited so that the next layer of particles placed on a surface of the previous layer is not subject to particle rearrangement due to capillary forces. Moreover, a hardened binder is not subject to contamination from solvents which may be used in powder deposition. In other cases, it may not be necessary that the binder be fully hardened between layers and a subsequent layer of powder particles may be deposited on a previous layer which is not yet fully hardened.

Where hardening occurs at the time the binder is deposited, thermal curing, i.e., evaporation of the binder carrier liquid, for such purpose would generally require that the component being formed be warmed as the printing of the binder material is performed, while the printhead itself is cooled so that unprinted binder material in the reservoir of the ink-jet head retains its desired properties. Such hardening can be achieved by heating the binder material indirectly, as by heating the overall apparatus in which the part is being formed using an appropriate external heat source, for example, or by heating the binder material directly as by applying hot air to the binder material or by applying infra-red energy or microwave energy thereto. Alternatively, a variety of thermally activated chemical reactions could also be used to harden the binder. For example, gelation of alkali silicate solutions can be made to occur by a change in pH accompanying the decomposition of organic reagents. Thus, a mixture of alkali silicate and formamide could be printed on to a hot component being formed. The rapid increase in temperature would greatly increase the formamide decomposition rate and, therefore, rapidly change the pH of the binder. Other thermally or chemically initiated techniques for hardening of the binder upon deposit thereof could be devised within the skill of those in the art.

While liquid and colloidal binder materials have been discussed above, in some applications binder material may be deposited in the form of binder particles entrained in a liquid. Such binder materials can be supplied via specially designed compound ink-jet structures capable of providing such entrained binder materials. An example of such a composite structure is discussed, for example, in the article "Ink-Jet Printing," J. Heinzle and C. H. Hertz, Advances In Electronics and Electron Physics, Vol. 65.

Moreover, in some applications in the fabrication of a part, the binder material which is used need not be a single binder material, but different binder materials can be used for different regions of the part being formed, the different materials being supplied by separate binder deposition heads.

Using the method described herein, component parts and structures having intricate internal surfaces and geometries or microstructures are now feasible. Due to the brittle nature of ceramic material, parts made from this material will need reinforcement. U.S. Pat. No. 5,626,914 describes ceramic materials infiltrated by molten metals within microporous regions of the ceramic. The infiltration of metal into pores of the ceramic material, however, does not allow for precise placement of reinforcement parts at known stress or fracture points. One application of producing intricate internal surfaces and microstructures described herein includes, for example, ceramic parts having high aspect ratio microstructured holes capable of receiving metal reinforcement materials. In one embodiment, products produced according to the process of the present invention will include internal micro or small voids or micro-cavities having aspect ratios in the range of 5:1 to 100:1, or more specifically, an aspect ratio of 5:1, 10:1, 25:1, 50:1, or 100:1. In another embodiment, the products produced according to the method described herein include small internal voids, micro-cavities, or hollows having an internal diameter of approximately 0.010 inch to 0.100 inch, more specifically, 0.025 inch to 0.050 inch, and a depth of approximately 1 inch to 40 inches.

Many possible combinations of powder and binder materials can be selected in accordance with the invention. For example, ceramic powders or ceramic fibers can be used with either inorganic or organic binder materials or with a metallic binder material; a metal powder can be used with a metallic binder or a ceramic binder; and a plastic powder can be used with a solvent binder or a plastic binder, e.g., a low viscosity epoxy plastic material. Other appropriate combinations of powder and binder materials will occur to those in the art for various applications.

These and other embodiments will become more apparent during the description of a specific example.

EXAMPLES

Example 1: General Procedure

First phase: To produce a ceramic structure in accordance to the method of the present invention, a photopolymer printer (e.g., 3D SYSTEMS VISIJET) is used to fabric a plastic die having a structure forming an external surface and an internal hollow cavity. The internal hollow cavity will be fabricated by printing a structure with an internal diameter of 0.016 inch and a depth of 0.5 inch to 1 inch long. The plastic die is produced using a tipcap pin having 0.045 inch diameter through an additive printing process. A slurry of ceramic materials, such as siloxane, silica, zircon, alumina, yttria is injected into the portion of the plastic die representing the external surface such that the slurry forms around the internal hollow cavity. Following one or more rounds of sintering at a temperature of about 1600.degree. C., the green body is cured and the plastic die is removed or burned off leaving an internal hollow cavity having a diameter of approximately 0.016 inches and a depth of 0.5 inches to 1 inch.

Second phase: the internal hollow cavity created during the first phase may be filled with another slurry of material or a solid material. In the case of a slurry material, the material may be injected into the internal hollow cavity created in the first phase, and cured using the same procedure described above. In the case of a solid material, a quartz rod, alumina rod, or metal rod or any other solid material having a diameter of approximately 0.014 inch and a length of 0.4 inch to 0.75 inch is incorporated into the internal hollow cavity.

Whether the material incorporated into the internal cavity is another ceramic slurry or a solid material, the product having both first and second phase materials is again heated at a temperature of approximately 1600° C. thereby sintering the first and second phase materials together to form a contiguous object or structure.

Example 2: Alumina Rod Insertion

A plastic die is printed in accordance with the procedure set forth in Example 1. The plastic die will be designed to include both an external surface and an internal cavity having an outside diameter of 0.013 inch and a depth of 0.5 inch. As described before, a ceramic slurry is injected into the external portion of the plastic die. The ceramic portion now within the external portion of the die is heated to a temperature of 500° C. to cure the ceramic matrix as well as to burn off the plastic die. An alumina rod having a diameter of approximately 0.011 inch and a length of 0.5 inch that is coated in ceramic-based slurry is inserted into the internal cavity created by the internal hollow cavity. The combined ceramic and alumina rod is heated at a temperature of approximately 1600° C. to sinter the ceramic matrix and alumina rod, where the sintering creates a bond at the interface of the matrix and the rod. The resulting product is a reinforced ceramic body.

The invention claimed is:

1. A method of forming a composite structure comprising:
   adding a first material into a die having a cavity, wherein the cavity includes at least one protrusion within the cavity;
   curing the first material to form a three dimensional body;
   removing the die during the curing of the first material, thereby leaving at least one void where the at least one protrusion once existed;

adding a binder material to the at least one void after curing the first material; and adding at least one other material into the at least one void, wherein the at least one other material is a ceramic material added by injection.

2. The method of claim 1, wherein the first material is added by injection.

3. The method of claim 1, wherein the first material is an inorganic material.

4. The method of claim 1, wherein the at least one protrusion within the cavity is a hollow or a solid protrusion.

5. The method of claim 1, wherein the at least one protrusion is hollow.

6. The method of claim 1, wherein the at least one protrusion is of a non-linear geometry.

7. The method of claim 1, wherein the die is removed by heating in the range of 300-600° C.

8. The method of claim 1, further comprising incorporating the binder prior to adding the at least one other material.

9. The method of claim 1, wherein the binder is applied to the at least one void, the at least one other material, or to both.

10. The method of claim 1, wherein the at least one void has an aspect ratio in the range of 100:1 to 5:1.

11. The method of claim 1, wherein the at least one void has an aspect ratio of greater than 20:1.

12. The method of claim 1, wherein the binder material is non-metallic.

13. The method of claim 1, wherein the cavity is produced by additive manufacturing the die.

14. The method of claim 13, wherein the die is fabricated from thermoset or thermoplastic polymer.

15. The method of claim 1, further comprising sintering or curing the at least one other material.

16. The method of claim 15, wherein the sintering or curing of the at least one other material occurs at a temperature in the range of 1,000-1,600° C.

17. A method of forming a composite structure comprising:

adding a first material into a die having a cavity, wherein the cavity includes at least one protrusion within the cavity;

curing the first material to form a three dimensional body;

removing the die during the curing of the first material, thereby leaving at least one void where the at least one protrusion once existed;

adding a binder material to the at least one void after curing the first material; and adding at least one other material into the at least one void;

wherein the first material is a ceramic slurry and the at least one other material is an alumina rod inserted into the void.

18. The method of claim 17, wherein the cavity is produced by additive manufacturing the die.

19. The method of claim 17, wherein the die is fabricated from thermoset or thermoplastic polymer.

20. The method of claim 17, wherein the at least one protrusion within the cavity is a hollow or a solid protrusion.

21. The method of claim 17, wherein the at least one protrusion is of a non-linear geometry.

22. The method of claim 17, wherein the at least one void has an aspect ratio in the range of 100:1 to 5:1.

23. The method of claim 17, further comprising sintering or curing the at least one other material.

* * * * *